(No Model.) 2 Sheets—Sheet 1.
R. S. JENNINGS.
FISH PACKAGE.
No. 291,195. Patented Jan. 1, 1884.
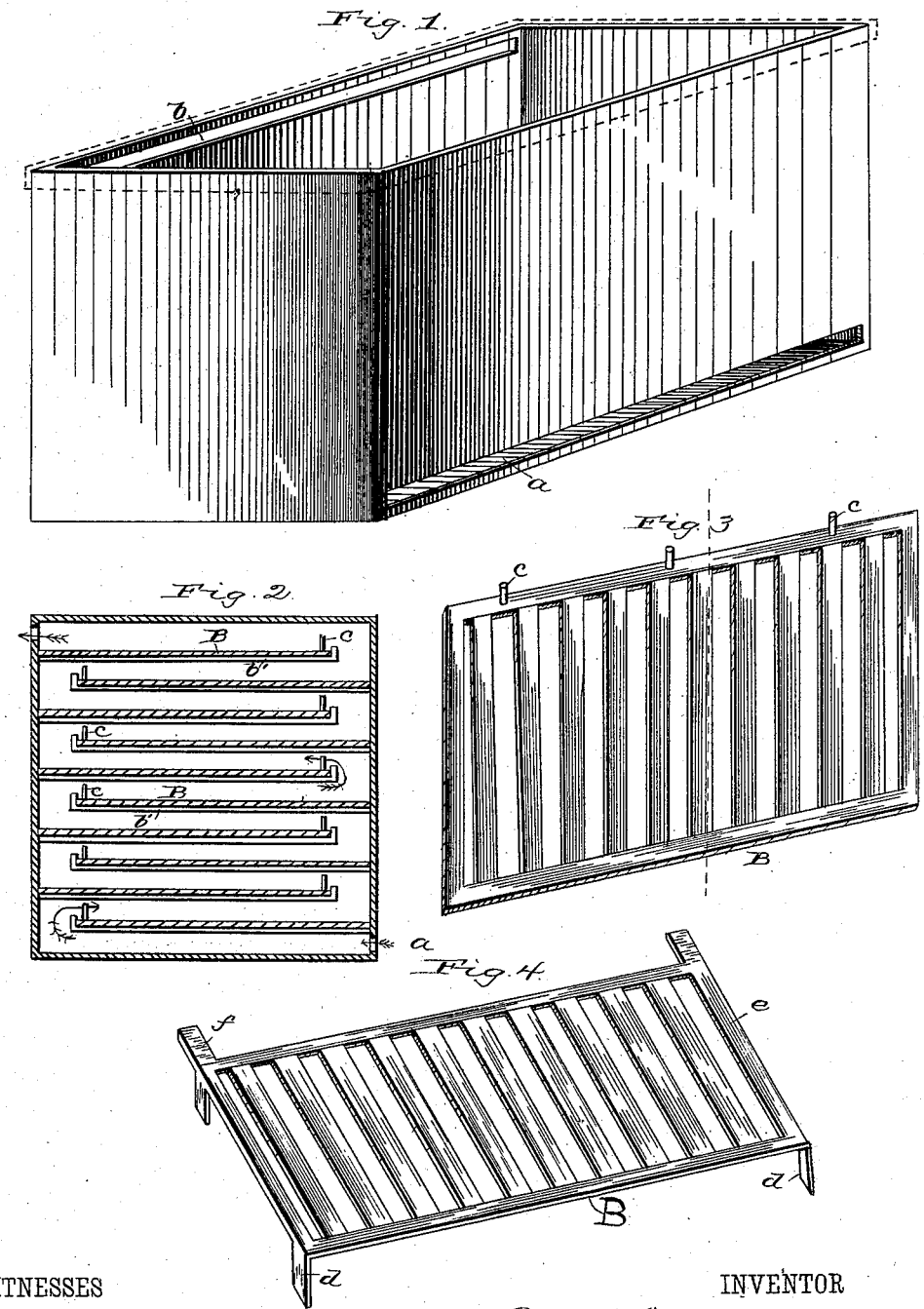
WITNESSES
Chas. R. Burr
W. E. Bowen
INVENTOR
Ralph S. Jennings
by Doubleday & Bliss
ATTORNEYS (No Model.)  2 Sheets—Sheet 2.
R. S. JENNINGS.
FISH PACKAGE.
No. 291,195.  Patented Jan. 1, 1884.
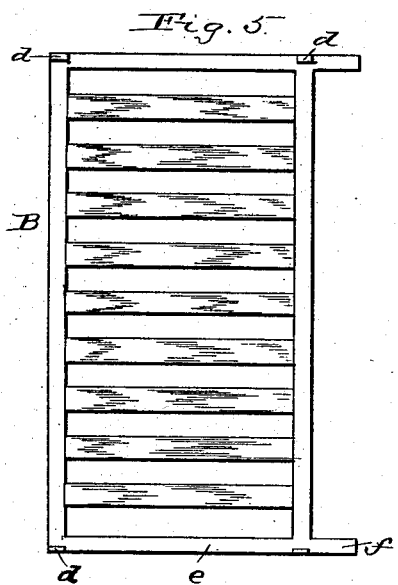
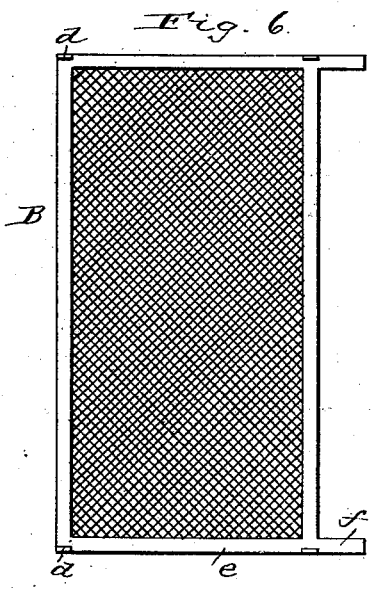
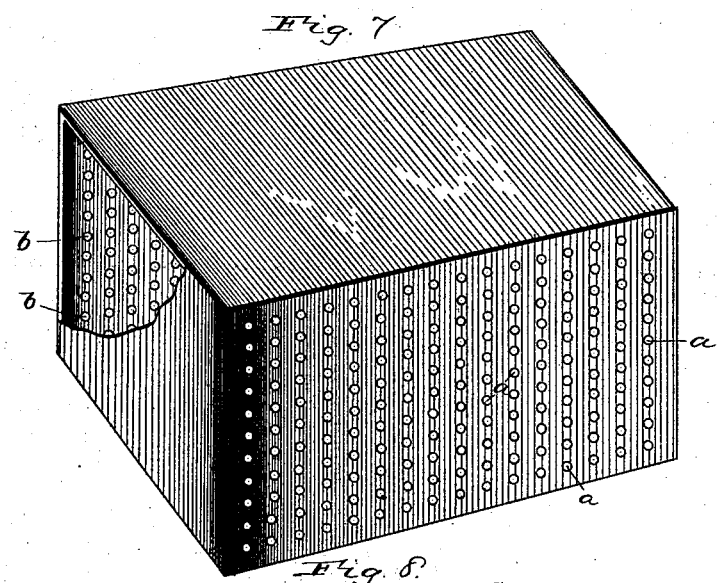
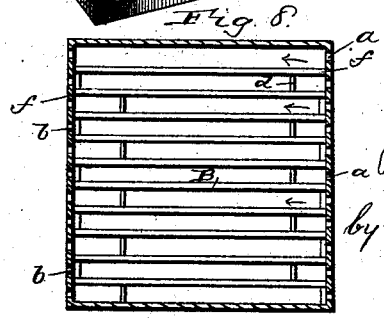
WITNESSES
Chas. R. Burr
W. E. Bowen
INVENTOR
Ralph S. Jennings
by Doubleday & Bliss
ATTORNEY

UNITED STATES PATENT OFFICE.

RALPH S. JENNINGS, OF BOSTON, MASSACHUSETTS.

FISH-PACKAGE.

SPECIFICATION forming part of Letters Patent No. 291,195, dated January 1, 1884.

Application filed February 23, 1883. (No model.)

*To all whom it may concern:*

Be it known that I, RALPH S. JENNINGS, a citizen of the United States, residing at Boston, in the county of Suffolk and State of Massachusetts, have invented certain new and useful Improvements in Fish-Packages, of which the following is a specification, reference being had therein to the accompanying drawings.

Figure 1 is a perspective view of a box or package embodying my improvements. Fig. 2 is a cross-section of the same. Fig 3 is a view of one of the supporting-racks detached. Figs. 4, 5, and 6 show modified forms of the racks. Fig. 7 is a perspective of a modified form of the box, and Fig. 8 is a cross-section of the same.

It is well known to those who are experienced in the packing and transporting of fish that when they are stored in large numbers in boxes, and in such manner as to come in contact one with another, there results a heating, and a consequent decomposing, which are objectionable, and which I avoid. I attain my purpose by so supporting the fish in the box that they are not allowed to come in contact with each other to such an extent as to cause heating, and, moreover, so as to allow, if desired, a free circulation of the air, that they may be kept in proper condition.

In Figs. 1 and 2 I have shown a package made with a top, bottom, and side pieces, forming an outer casing. The outer casing is shown in Fig. 1, and the casing and supports are shown in Fig. 2. It is preferable to have the outer casing (or the box proper) substantially tight, in order to prevent dust, disagreeable gases, odors, and other objectionable materials from coming in contact with the fish while being transported. When the boxes are thus made tight or with continuous walls, they are provided with an aperture, *a*, in one or the other of the sides or ends, through which air is allowed to enter, and another aperture, *b*, in one or the other side or end, through which said air can escape. The air which enters the aperture *a* is compelled to pass between or around the fish, and it keeps the surfaces of them dry, and cools them to such an extent that they may be carried long distances and kept for a long time without any impairing of their qualities.

To assist the air in its passage through the package, I combine with the devices already described means for keeping the fish more or less isolated one from the other. When large fish—such as cod—are to be stored in the package, I prefer to have each one supported entirely independent of the others. In the construction shown in Figs. 1 and 2 this is accomplished by means of partitions or supports B, so spaced that one fish will lie between two of the partitions, the fish being thus kept separated one from another. The partitions or supports can be formed, as shown in Figs. 3, 4, and 5, of narrow thin strips of wood or pasteboard, or of the latter material in sheets, with slots or apertures, to allow the air to come freely in contact with the fish, or they may be constructed of wire-gauze, as shown in Fig. 6, or of any other suitable material.

As shown in Fig. 2, the partitions or supports are held in the box by means of cleats *b'*, or cross-bars may be used, or other suitable support. These supports are arranged in the package in a zigzag manner—that is to say, each extends but part way across the package from the side opposite to that from which extend the two adjacent ones—so that there is formed a winding or broken passage for the air as it moves from the bottom to the top, the air taking the path indicated by the arrows. In said figures the aperture through which the air enters is shown as being at the bottom of one side, and the aperture through which it escapes is at the top on the other side. However, I do not wish to be limited to this exact form of construction and this arrangement of these apertures, as it will be readily seen that they can be modified without departing, essentially, from the spirit of my invention. Thus, as shown in Fig. 7, air-apertures may be so arranged on both sides of the box that the air after entering shall pass directly across the package, and escape through apertures in or nearly in the same plane as those through which it entered; or a single aperture or slot may be used at the bottom, and another at the top, both being formed in the same side piece.

To prevent lateral displacement of the fish, pins c, or equivalents, may be fastened to the supporting-partitions. The partitions, shelves, or supports need not be supported rigidly upon the side of the box, but may be so constructed that one may be supported upon another. Thus in Figs. 4, 5, 6, and 8 each is shown as being formed with legs or pins d, which operate to space them properly, and at the same time provide a support for one upon the other. To prevent them from moving laterally the end pieces, e, of the partitions may be extended or provided with arms or pins, as at f, so that the partitions will be held properly laterally, and at the same time said extensions will insure there being a free passage-way for the air at one side. It will be seen that after the fish have been thus packed it is impossible for any serious heating to occur under ordinary circumstances, even in the warmest weather, as the air is compelled to circulate freely throughout the package and in contact with both of the faces or the broad sides of the fish.

I do not wish to be limited to so arranging the supports and fish that one only of the latter shall lie upon each support, as many of the advantages of my invention can be attained if two or three fish are placed upon one support, for even then there will be such a circulation of air through the whole body of the contents as to largely do away with the evil results that have been incident to the packages heretofore employed.

In practice I make the boxes and partitions of a cheap material, and for the partitions or shelves ordinary light lathing may be used, and even then need not be dressed stuff. However, if desired, boxes or packages of the "return" kind can be constructed with my improved features—that is to say, those boxes which, after being used, are shipped back to those who store and transport the fish.

I am aware of the fact that packing and transporting boxes of various kinds have been provided with apertures, and I do not broadly claim such devices as my invention; but I am not aware of the fact that packages have been constructed as well adapted for the transportation of large fish as that which I have herein shown and described. To attain beneficial results it is necessary that the supporting partitions or shelves should be made of comparatively thin narrow strips, so as to expose as much as possible the surfaces of the fish lying thereon.

Egg-crates have been heretofore made with partitions provided with perforations, each adapted to receive the end of an egg, to support it, and of course structures of this class are among those which I mean to be understood as disclaiming; but I do not know of even such crates having been made with supports of lattice-work or thin, narrow cross-bars supported directly upon the bottom or the outer walls of the package.

What I claim is—

1. The herein-described portable package for transporting fish, it having a tight top and bottom and tight sides except that one side has an air-aperture at or near the bottom and the other side has another air-aperture at or near the top, in combination with partitions or shelves formed of narrow cross-bars constructed to allow large air-spaces between them, and arranged, substantially as set forth, to compel the air which enters the lower aperture through the side of the package to move in a broken or circuitous passage to the upper aperture, substantially as set forth.

2. The herein-described portable package for transporting fish, it consisting of an outside casing and interior partitions or shelves constructed of strips or supporting-pieces arranged to allow a free passage of air between them, and each arranged to project part way across the side of the package opposite to the side from which the adjacent partitions or shelves project, and air-apertures through the sides of the casing, substantially as set forth.

3. In a portable package for transporting fish, the combination of the external casing and the interior partitions or supports, each having at one edge a cut-away portion or passage for air, and means, substantially as set forth, to prevent the fish from moving over said passage.

In testimony whereof I affix my signature in presence of two witnesses.

RALPH S. JENNINGS.

Witnesses:
 H. H. BLISS,
 HENRY H. PAGE.